United States Patent [19]

Bolinger

[11] Patent Number: 5,146,245
[45] Date of Patent: Sep. 8, 1992

[54] ADJUSTABLE SPECTACLE LEG APPARATUS

[76] Inventor: Judd A. Bolinger, 2421 John B. Dennis Hwy. #108, Kingsport, Tenn. 37660-4773

[21] Appl. No.: 723,777

[22] Filed: Jul. 1, 1991

[51] Int. Cl.⁵ .................... G02C 5/20; G02C 5/14
[52] U.S. Cl. ......................... 351/118; 351/122
[58] Field of Search .................. 351/116–118, 351/122–123, 121

[56] References Cited

U.S. PATENT DOCUMENTS

| 3,612,668 | 10/1971 | Watkins | 351/118 |
| 3,854,801 | 12/1974 | Hoke | 351/118 |
| 4,787,728 | 11/1988 | Anger | 351/119 |
| 4,804,260 | 2/1989 | Anger | 351/118 |

Primary Examiner—Rodney B. Bovernick
Assistant Examiner—James Phan
Attorney, Agent, or Firm—Leon Gilden

[57] ABSTRACT

An eyeglass assembly including a rim organization to mount spectacle lenses therewithin pivotally mounts a plurality of temple legs, with a temple leg pivotally mounted at each end of the rim organization. The temple legs each include an arcuate earpiece leg that mounts an internally threaded rod rotatably received within an internally threaded bore formed longitudinally of each terminal end of each temple leg to permit adjustment of each earpiece leg relative to each temple leg.

4 Claims, 4 Drawing Sheets

Fig 1
Fig 2
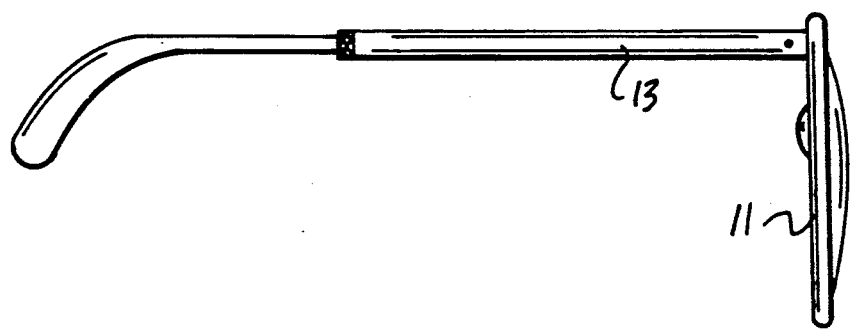

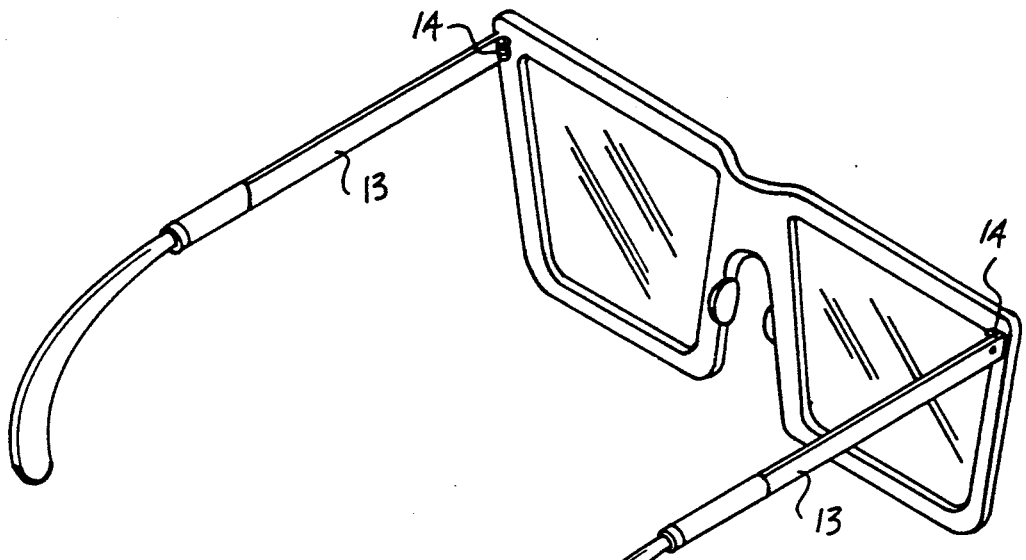
FIG 3
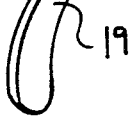
FIG 4
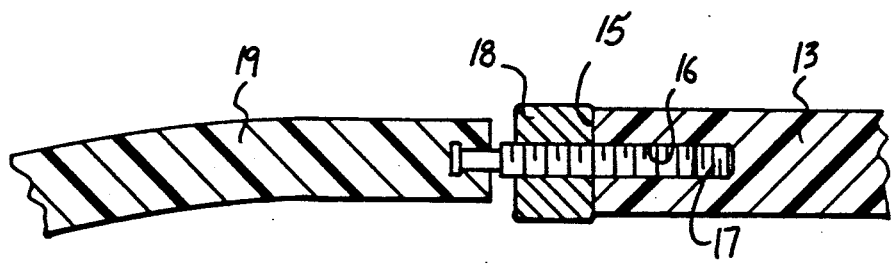

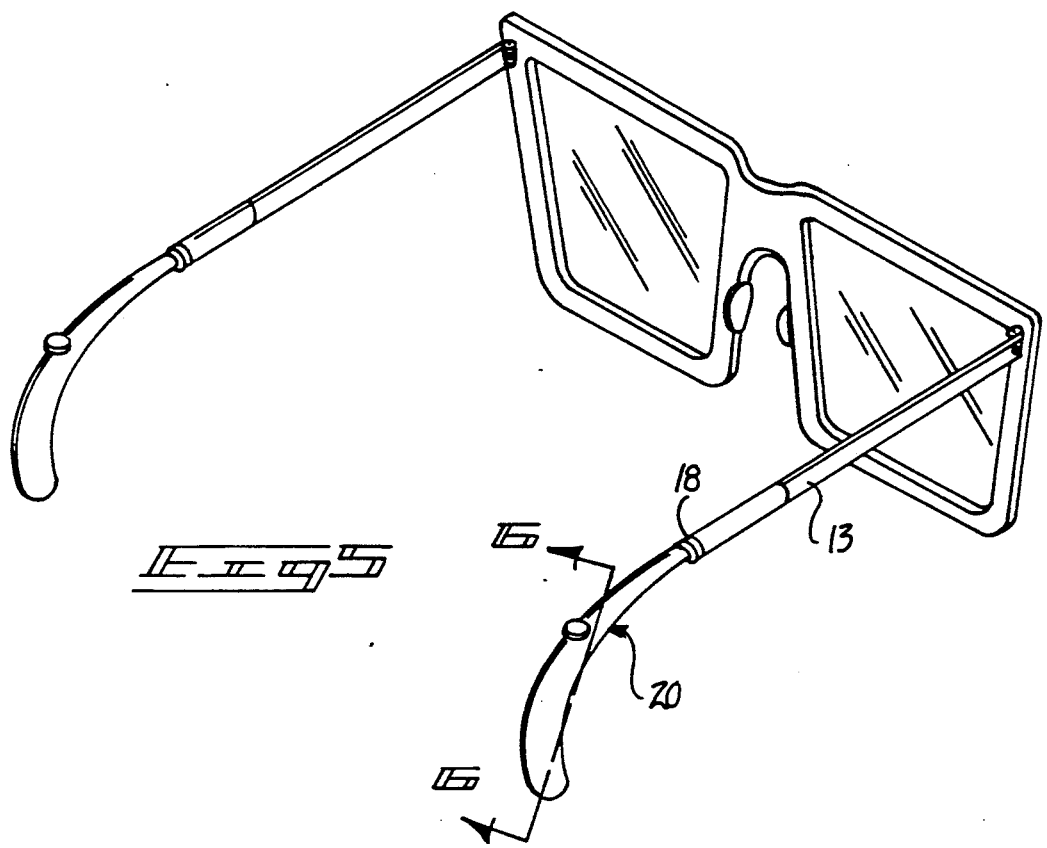
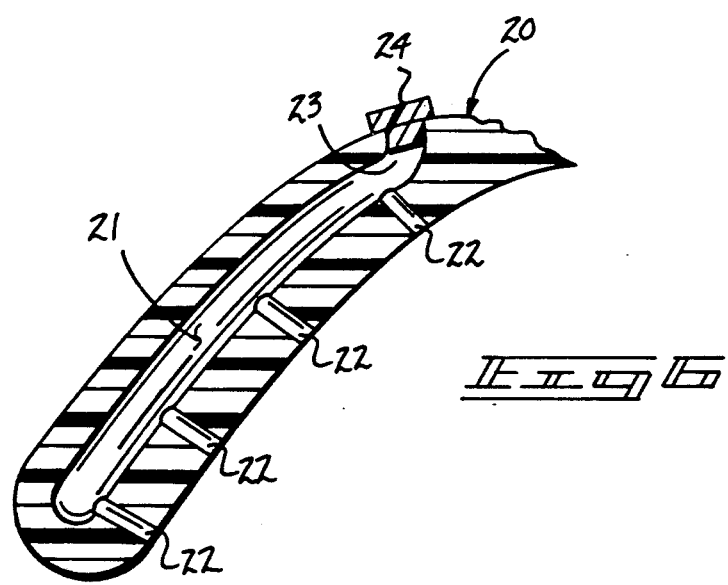

ADJUSTABLE SPECTACLE LEG APPARATUS

BACKGROUND OF THE INVENTION

1. Field of the Invention

The field of invention relates to eyeglass apparatus, and more particularly pertians to a new and improved adjustable spectacle leg apparatus wherein the same includes earpiece legs adjustably mounted relative to each temple leg.

2. Description of the Prior Art

Accommodating various cranial geometries of individuals to receive eyeglass frames thereon requires time consuming and labor intensive procedures. Further, conventional eyeglass assemblies during normal usage are frequently dropped, deformed, exposed to sun, depressed temperatures and the like to alter the geometric configuration and integrity of an eyeglass assembly. Positioning of an eyeglass assembly relative to an individual is a significant and important aspect in the proper alignment of the eyeglass assembly relative to an individual's focal orientation, as well as to minimize damage due to improperly mounted eyeglass organizations.

Prior art structure to address these problems has been exemplified in U.S. Pat. No. 4,844,605 to Peterson, et al. wherein an auxiliary earpiece is mounted relative to each temple leg of an eyeglass assembly for securement to an individual.

U.S. Pat. No. 4,732,465 to Field sets forth an eyeglass holder wherein flexible sheets are directed through each earpiece to enhance securement of each earpiece to an individual.

U.S. Pat. No. 4,925,291 to Anger, et al. sets forth a readily deformable earpiece leg.

As such, it may be appreciated that there continues to be a need for a new and improved adjustable spectacle leg apparatus as set forth by the instant invention which address both the problems of ease of use as well as effectiveness in construction and in this respect, the present invention substantially fulfills this need.

SUMMARY OF THE INVENTION

In view of the foregoing disadvantages inherent in the known types of eyeglass apparatus now present in the prior art, the present invention provides an adjustable spectacle leg apparatus wherein the same includes an adjustable earpiece mounted to a temple leg to permit longitudinal adjustment of the earpiece relative to an associated temple leg. As such, the general purpose of the present invention, which will be described subsequently in greater detail, is to provide a new and improved adjustable spectacle leg apparatus which has all the advantages of the prior art eyeglass apparatus and none of the disadvantages.

To attain this, the present invention provides an eyeglass assembly including a rim organization to mount spectacle lenses therewithin pivotally mounting a plurality of temple legs, with a temple leg pivotally mounted at each end of the rim organization. The temple legs each include an arcuate earpiece leg that mounts an internally threaded rod rotatably received within an internally threaded bore formed longitudinally of each terminal end of each temple leg to permit adjustment of each earpiece leg relative to each temple leg.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable spectacle leg apparatus which has all the advantages of the prior art eyeglass apparatus and none of the disadvantages.

It is another object of the present invention to provide a new and improved adjustable spectacle leg apparatus which may be easily and efficiently manufactured and marketed.

It is a further object of the present invention to provide a new and improved adjustable spectacle leg apparatus which is of a durable and reliable construction.

An even further object of the present invention is to provide a new and improved adjustable spectacle leg apparatus which is susceptible of a low cost of manufacture with regard to both materials and labor, and which accordingly is then susceptible of low prices of sale to the consuming public, thereby making such adjustable spectacle leg apparatus economically available to the buying public.

Still yet another object of the present invention is to provide a new and improved adjustable spectacle leg apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in use.

FIG. 2 is an orthographic side view of the invention.

FIG. 3 is an isometric rear view of the invention.

FIG. 4 is an orthographic cross-sectional illustration of a junction of the earpiece leg and temple leg of the invention.

FIG. 5 is an isometric illustration of a further asepct of the invention.

FIG. 6 is an orthographic view, taken along the lines 6—6 of FIG. 5 in the direction indicated by the arrows.

DESCRIPTION OF THE PREFERRED EMBODIMENT

Figure 7:
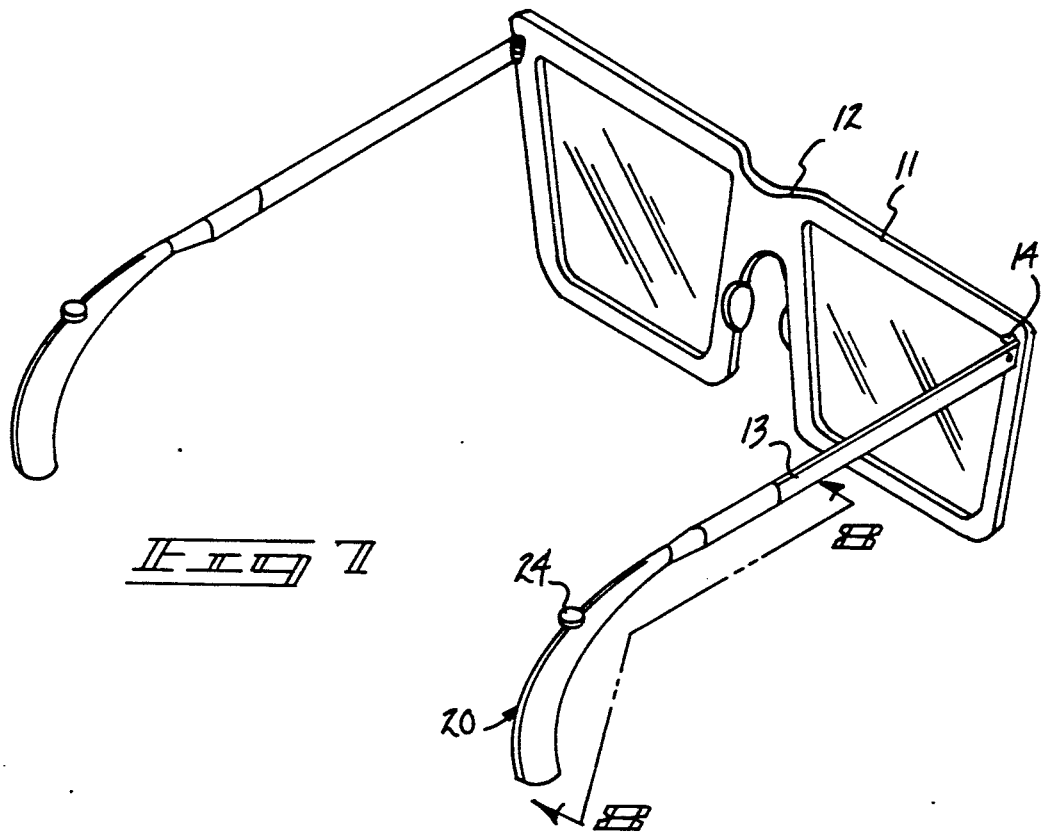
FIG. 7 is an isometric illustration of a further modification of the invention.

With reference now to the drawings, and in particular to FIGS. 1 to 8 thereof, a new and improved adjustable spectacle leg apparatus embodying the principles and concepts of the present invention and generally designated by the reference numeral 10 will be described.

More specifically, the adjustable spectacle leg apparatus 10 of the instant invention essentially comprises a pair of spectacle rims 11 defining lens support frames for securement of correcting lenses therewithin, with a connecting bridge 12 securing the rims together. A temple leg 13 is pivotally mounted relative to each end of the rims 11 by a temple leg hinge 14, as illustrated in FIG. 3 for example. Each temple leg 13 includes a temple leg rear end orthogonally oriented relative to a longitudinal axis of each temple leg, with an internally threaded bore 16 longitudinally aligned relative to each temple leg directed interiorly thereof from the temple leg rear end 15. An externally threaded cylindrical stud 17 is selectively threaded and directed into the threaded bore 16, with an internally threaded jamb nut 18 arranged in contiguous communication with the temple leg rear end 15 about the externally threaded cylindrical stud 17 to lock an associated flexible acruate earpiece leg 19 relative to the temple leg 13, wherein the externally threaded cylindrical stud 17 is fixedly mounted within a forward end of the earpiece leg 19. In this manner, longitudinal adjustment of the earpiece leg 19 relative to the temple leg 13 is available.

FIGS. 5 and 6 illustrate a modified arcuate earpiece leg 20, also of flexible construction, including a first leg member 20a and a second leg member 20b, joined together to define an obtuse angle therebetween. The second leg member 20b includes a central reservoir cavity 21, including a plurality of cavity channels 22 in fluid communication within the cavity 21 to direct a fluid or skin soothing lotion into the cavity 21 through the channels 22 to an individual's ear in instances where chafing and application of medication or lotion is provided. A cavity entrance opening 23 is directed into the cavity 21 from an upper terminal end portion of the second leg member 20b.

Figure 8:
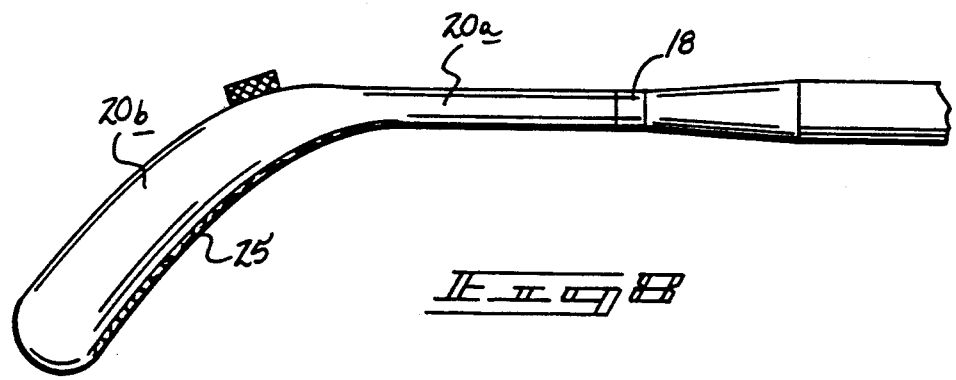
FIG. 8 is an orthographic view, taken along the lines 8—8 of FIG. 7 in the direction indicated by the arrows.

The organization, as illustrated in FIGS. 7 and 8, include a porous web 25 mounted to a forward surface of the second leg member 20b and the first leg member 20a at an intersection defined by the first and second leg members through the interior concave defined by the first and second leg members forming the modified arcuate earpiece leg 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What s claimed as being new and desired to be protected by Letters Patent of the United States is as follows:

1. An adjustable spectacle leg apparatus, comprising,
   a spectacle assembly, including a pair of rims, with a connecting bridge securing the rims together, and
   a plurality of temple legs, each temple leg of the plurality of temple legs hingedly mounted to the bridge at a forward terminal end of each temple leg, and
   each temple leg defining an elongate longitudinal axis, wherein each temple leg includes a temple leg rear end, each temple leg rear end is orthogonally oreinted relative to the temple leg longitudinal axis, and
   an internally threaded bore, the internally theaded bore longitudinally aligned relative to the longitudinal axis and extending into each temple leg from the temple leg rear end, and
   a flexible arcuate earpiece leg, the flexible arcuate earpiece leg including a first leg member and a second leg member defining an obtuse angle therebetween, and a concave forward surface, the fist leg member including an externally threaded cylindrical stud extending forwardly of the first leg and complementarily received within the internally threaded bore, and
   an internally threaded jamb nut threadedly mounted about the external threaded cylindrical stud for contiguous communication with the internally threaded bore upon adjustment of the externally threaded cylindrical stud relative to the internally threaded bore.

2. An apparatus as set forth in claim 1 wherein the flexible arcuate earpiece leg includes a central reservoir cavity within the earpiece leg, the central reservoir cavity includes a plurality of cavity channels directed from the central reservoir cavity into the concave surface of the earpiece leg.

3. An apparatus as set forth in claim 2 including a cavity entrance opening directed through an upper end of the earpiece leg adjacent and intersection of the first leg member relative to the second leg member, and a cavity cap selectively removable relative to the entrance opening to permit fluid to be directed into the central reservoir cavity.

4. An apparatus as set forth in claim 3 including a porous web mounted to the concave surface in communication with the cavity channels to direct fluid from the central reservoir cavity to the porous web.

* * * * *